(12) United States Patent
Hiramatsu et al.

(10) Patent No.: US 6,510,189 B1
(45) Date of Patent: Jan. 21, 2003

(54) CHANNEL SWITCHING DEVICE AND CHANNEL SWITCHING METHOD

(75) Inventors: Katsuhiko Hiramatsu, Yokosuka (JP); Atsushi Matsumoto, Kawasaki (JP); Hideyuki Takahashi, Yokosuka (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/284,243
(22) PCT Filed: Sep. 9, 1998
(86) PCT No.: PCT/JP98/04051
§ 371 (c)(1), (2), (4) Date: Apr. 14, 1999
(87) PCT Pub. No.: WO99/13665
PCT Pub. Date: Mar. 18, 1999

(30) Foreign Application Priority Data

Sep. 10, 1997 (JP) .............................................. 9-264976

(51) Int. Cl.[7] .................................................. H04B 1/10
(52) U.S. Cl. ........................ 375/349; 375/346; 455/464
(58) Field of Search ................................. 375/349, 346, 375/347; 370/341, 329, 331, 332, 437; 455/464, 465, 436, 442

(56) References Cited

U.S. PATENT DOCUMENTS

| 5,138,609 A | * | 8/1992 | Hashimoto | 370/228 |
| 5,533,010 A | * | 7/1996 | Tanaka | 370/342 |
| 6,201,954 B1 | * | 3/2001 | Soliman | 455/226.2 |

FOREIGN PATENT DOCUMENTS

| JP | 3-295325 | 12/1991 |
| JP | 6-140976 | 10/1992 |
| JP | 5-103024 | 4/1993 |
| JP | 8-331637 | 12/1996 |
| JP | 9-224284 | 8/1997 |
| JP | 9-247732 | 9/1997 |

OTHER PUBLICATIONS

English language abstract of Japanese Publication 3-295325.
English language abstract of Japanese Publication 6-140976.
English language abstract of Japanese Publication 5-103024.
English language abstract of Japanese Publication 9-224284.

* cited by examiner

Primary Examiner—Mohammad H. Ghayour
(74) Attorney, Agent, or Firm—Greenblum & Bernstein, P.L.C.

(57) ABSTRACT

The reception electric field strength of a desired wave is detected by desired wave reception electric field strength detecting means 102, the reception electric field strength of an interference wave is detected by interference wave reception electric field strength detecting means 103, and they are compared with each by comparing means 104 so as to calculate a D/U ratio. Also, an FER is detected by frame error rate detecting means 106. Future D/U ratio and FER are predicted from both histories and the switching of a communication channel is performed, whereby a reception state is detected without interrupting communications, and a communication quality is improved.

13 Claims, 5 Drawing Sheets

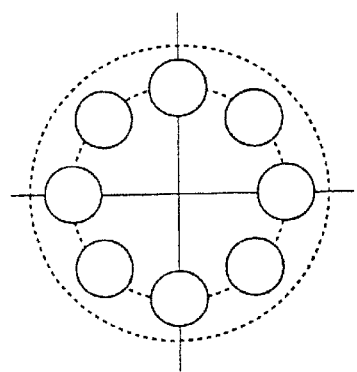
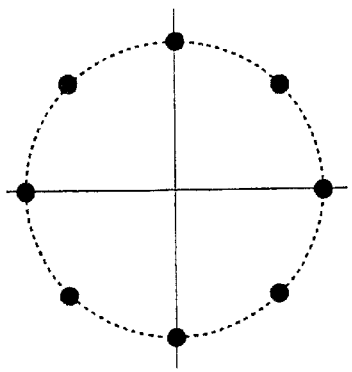
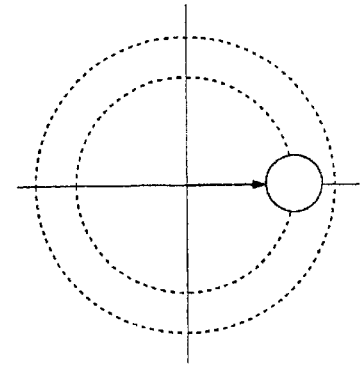
FIG. 6A FIG. 6B FIG. 6C
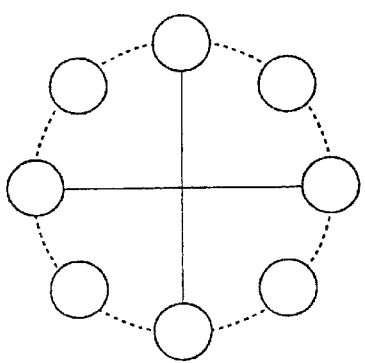
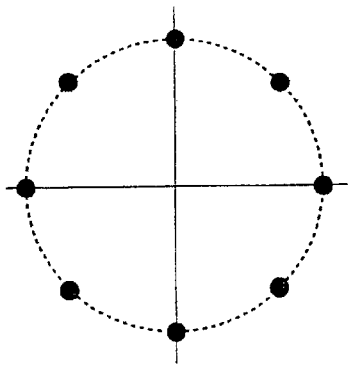
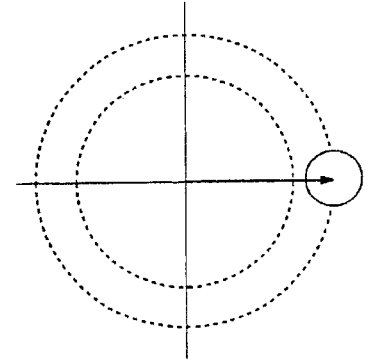
FIG. 7A FIG. 7B FIG. 7C

| FER<br>D/U | IMPROVE | CONSTANT | DETERIORATE |
|---|---|---|---|
| IMPROVE | MAINTAIN | MAINTAIN | MAINTAIN |
| CONSTANT | MAINTAIN | MAINTAIN | SWITCH |
| DETERIORATE | MAINTAIN | SWITCH | SWITCH |

CHANNEL SWITCHING DEVICE AND CHANNEL SWITCHING METHOD

TECHNICAL FIELD

The present invention relates to a channel switching apparatus for switching a communication channel when a communication quality in a radio communication is deteriorated, and to a channel switching method.

BACKGROUND ART

A conventional channel switching apparatus is structured to improve the communication quality by switching the communication channel when the communication quality is deteriorated during communications. This switching is performed on the basis of only a frame error rate and an absolute level of reception electric field strength of a receiving signal to which a desired wave and an interference wave are added.

However, in such a conventional channel switching apparatus, reception electric field strength of each of the desired wave and the interference wave is not determined. For this reason, there is a case in which the communication quality of the communication channel cannot be correctly grasped so that the channel switching cannot be appropriately performed.

DISCLOSURE OF INVENTION

In order to solve the above problem, an object of the present invention is to provide a channel switching apparatus, which can correctly grasp the communication quality of the communication channel so as to perform an appropriate channel switching and to improve the communication quality.

In order to attain the above object, the channel switching apparatus of the present invention comprises desired wave reception electric field strength detecting means for detecting desired wave reception electric field strength of a mobile station, and interference wave reception electric field strength detecting means for detecting interference wave reception electric field strength in the same frequency. Then, a ratio of reception electric field strength detected by these detecting means is obtained, and the communication channel is switched based on the obtained ratio. This can bring about stable communications by switching the communication channel when the communication quality of the communication channel is deteriorated even if the absolute reception electric field strength level is high.

Also, the channel switching apparatus of the present invention comprises storing means for storing a comparison result between the reception electric field strength of the desired wave and the that of the interference wave and a detection result of frame error rate detecting means, respectively, and predicting means for predicting a future network state from both the stored comparison result and detection result. This can absorb the variations in the desired wave electric field strength and the interference wave electric field strength caused by fading or a calculation error. Also, this can prevent from erroneously switching the channel, thereby making it possible to obtain an appropriate channel switching. Also, the communication channel can be switched based on a predicted result in advance before the communication quality is completely deteriorated so that communications are difficult to be executed. This makes it possible to ensure the stable communications.

BRIEF DESCRIPTION OF THE DRAWINGS

FIGS. 6(a)–6(c) are explanatory views of an operation of a correlating device of the channel switching apparatus according to the second embodiment of the present invention;

FIGS. 7(a)–7(c) are explanatory views of an operation of a correlating device of the channel switching apparatus according to the second embodiment of the present invention;

BEST MODE FOR CARRYING OUT THE INVENTION

Embodiments of the present invention will now be specifically explained with reference to FIGS. 1 to 9.

First Embodiment

Figure 1:
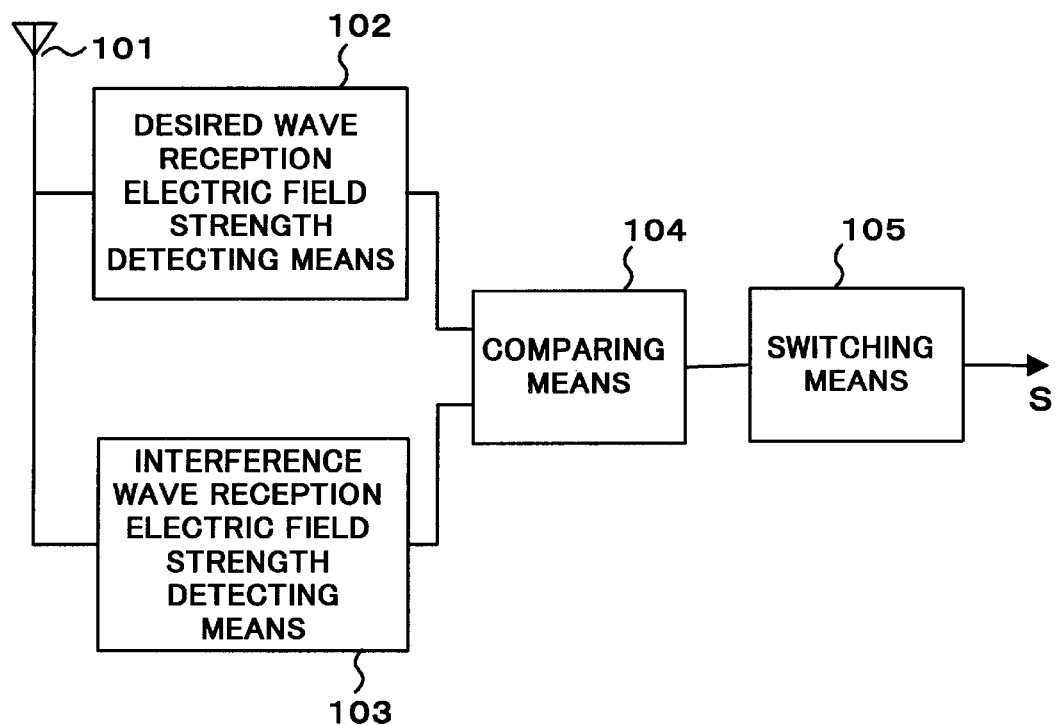
FIG. 1 is a schematic block diagram of the channel switching apparatus according to a first embodiment of the present invention.

FIG. 1 shows the channel switching apparatus according to the first embodiment of the present invention. An antenna 101 receives a radio signal. Desired wave reception electric field strength detecting means 102 detects reception electric field strength of a desired wave from a radio wave, which the antenna 101 has received. Interference wave reception electric field strength detecting means 103 detects reception electric field strength of an interference wave from the radio wave, which the antenna 101 has received. Comparing means 104 compares two reception electric field strength detected by the desired wave reception electric field strength detecting means 102 and the interference wave reception electric field strength detecting means 103. Switching means 105 switches a channel based on the comparison result obtained by the comparing means 104 so as to output a channel switching instruction signal S.

Figure 2:
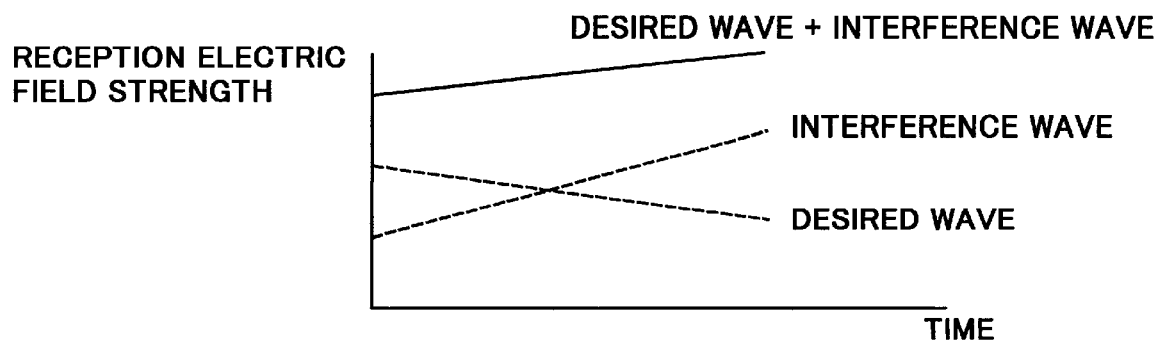
FIG. 2 is a view showing reception electric field strength of each of a desired wave and an interference wave according to the first embodiment.

An operation of the above-structured channel switching apparatus will be explained with reference to FIG. 2. FIG. 2 shows a level of each of the desired wave reception electric field strength and the interference wave reception electric field strength at a certain time, and an average value of a sum of the desired wave reception electric field strength and the interference wave reception electric field strength.

As shown in FIG. 2, the reception electric field strength of the desired wave and that of the interference wave vary in accordance with time. Then, the state of the communication quality of the desired wave changes relatively largely, depending on the reception electric field strength level of each of the desired wave and the interference wave. Therefore, from only the detection of the level of a sum of the desired wave and the interference wave, it cannot be determined that an increase and an decrease in the reception electric field strength is caused by the desired wave, the interference wave, or both waves. For this reason, the state of the communication quality can not be correctly grasped. However, according to the present invention, the above determination can be made as follows:

First of all, the desired wave reception electric field strength detecting means 102 detects the reception electric field strength of the desired wave based on the received signal from the antenna 101. Then, the interference wave reception electric field strength detecting means 103 detects the reception electric field strength of the interference wave based on the received signal from the antenna 101.

Next, the comparing means 104 inputs signals, showing the reception electric field strength, from these two detecting means, respectively. Then, a ratio (D/U ratio) of the desired wave electric field strength to the interference wave electric field strength is obtained. The switching means 105 determines whether or not communications can be performed by the channel currently in communications based on the D/U ratio so as to control the switching of the communication channel.

By the above-explained structure, the communication quality of the channel in communications can be accurately determined. For this reason, even if the absolute reception electric field strength level is high, the appropriate channel switching can be executed when the communication quality is relatively deteriorated, thereby making it possible to obtain the stable communications.

The first explained the case in which the channel in communications was switched. However, the channel allocation may be performed using the above D/U ratio when the channel is allocated at the time of staring communications.

Second Embodiment

Figure 3:
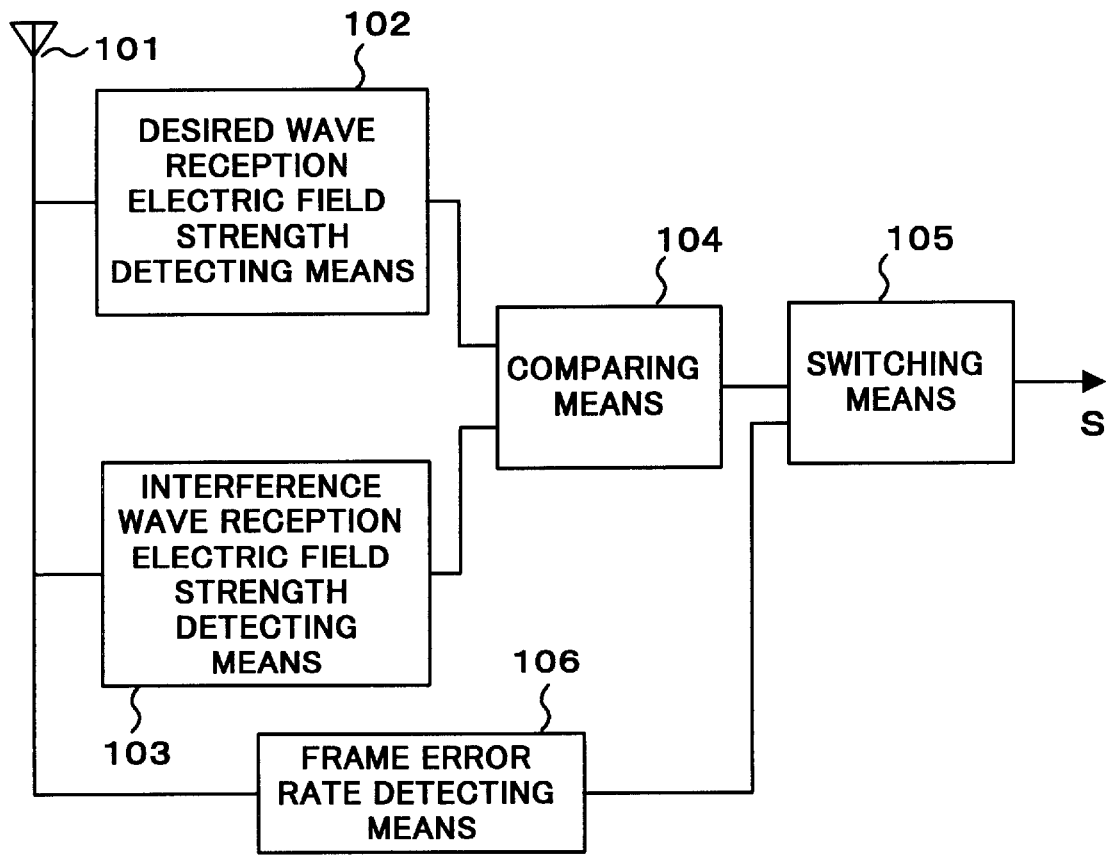
FIG. 3 is a schematic block diagram of the channel switching apparatus according to a second embodiment of the present invention.

Next, the channel switching apparatus according to the second embodiment of the present invention will be explained with reference to FIGS. 3 and 4. As shown in FIG. 3, the channel switching apparatus of the second embodiment comprises frame error rate detecting means 106 in addition to the structure of the first embodiment. The frame error rate detecting means 106 detects an FER (Frame Error Rate) of a slot number having a slot error. The detection of the error rate is thus performed in a frame unit, but the detection can be performed in a bit unit. In this case, a comparison between the D/U ratio and a bit error rate (BER) is executed.

The frame error rate detecting means 106 detects FER from the signal from the antenna 101 to be input to the switching means 105 together with the D/U ratio explained in the first embodiment. The switching means 105 outputs a signal S for switching the communication channel based on the input FER and D/U ratio.

According to the above-explained structure, even if the communication quality is deteriorated and FER is worsened with the deterioration of the communication quality, it is estimated that the communication quality of the communication channel currently in communications is high when the D/U ratio is high. Then, communications using the current communication channel is continued. As a result, there is no need of switching the communication channel unnecessarily, and a temporary blackout of communications caused by the switching can be prevented, and the channel capacity can be increased.

On the other hand, if FER becomes worse, the D/U ratio is checked, and the communication channel currently in communications is released based on the checking result, and the channel is speedily switched to the other channel. This eliminates interference with the other base station and the mobile station, so that the channel capacity can be increased.

Figure 4:
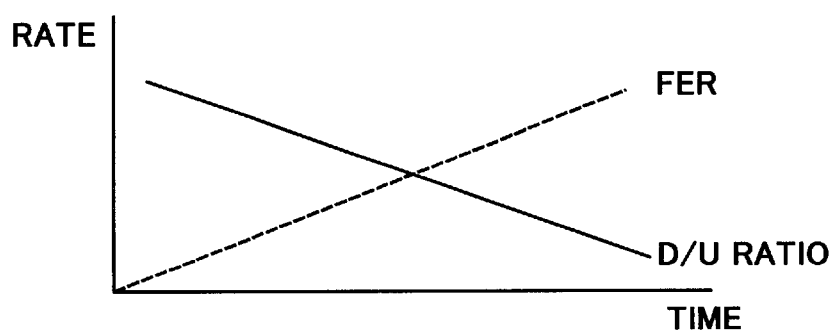
FIG. 4 is a view showing the relationship between a D/U ratio and FER according to the second embodiment of the present invention.

As shown in FIG. 4, Regarding the relationship between the D/U ratio and FER, there is a case in which FER is low and the D/U ratio is high. Conversely, there is a case in which FER is high and the D/U ratio is low. In this embodiment, the switching means 105 performs a comparison between the D/U ratio and FER and determination. Then, if FER is higher than a constant value, the communication channel is switched. Conversely, if the D/U ratio is higher than the constant value, the switching of the communication channel is not performed.

Therefore, the state of communication between the mobile station and the base station obtained when the frame error occurs can be correctly determined in consideration of the D/U ratio. For this reason, the switching of the communication channel can be appropriately performed.

Figure 5:
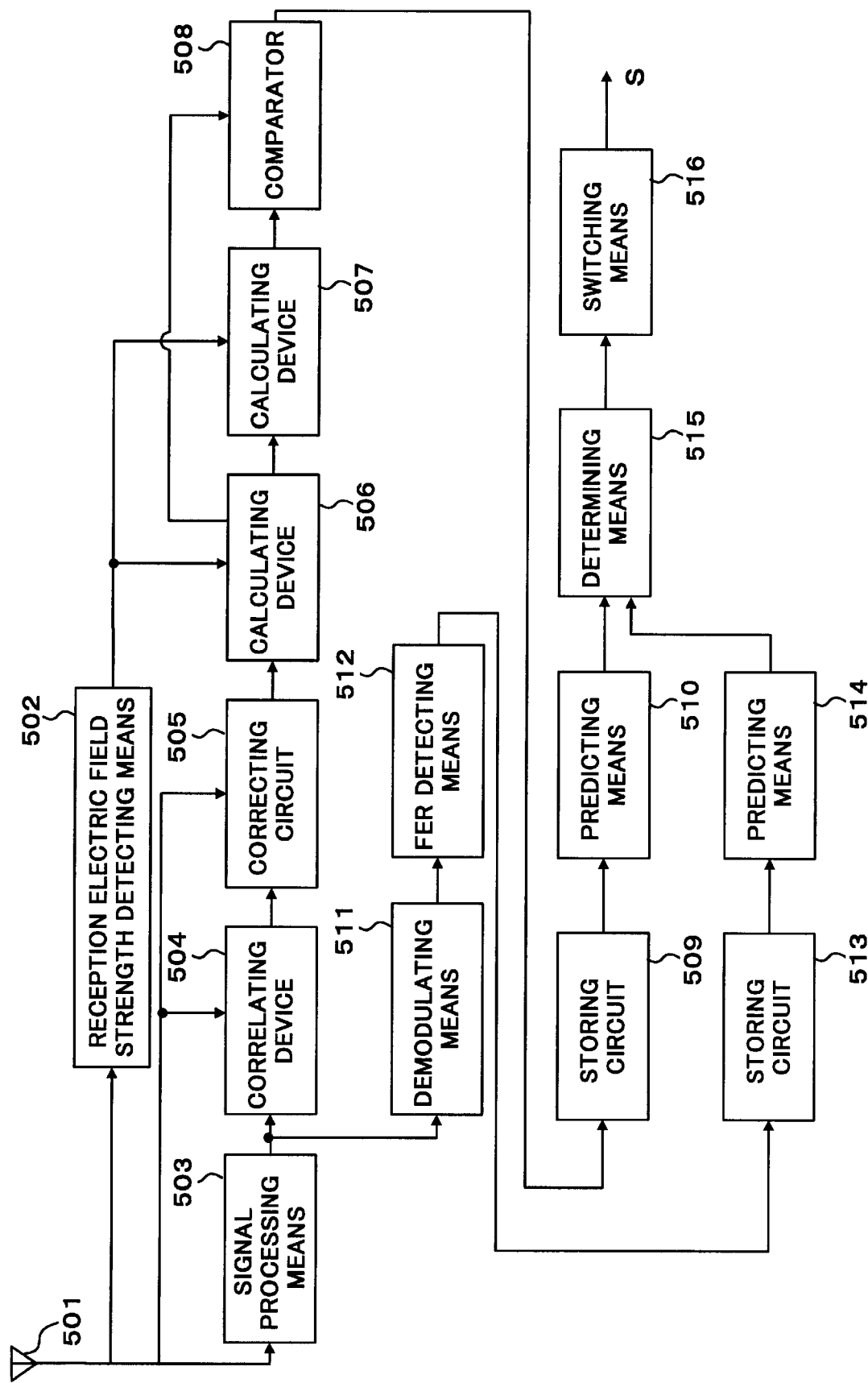
FIG. 5 is a block diagram showing the channel switching apparatus according to the second embodiment of the present invention.

Next, the channel switching apparatus of the second embodiment will be more specifically explained with reference to FIGS. 5 and 6. FIG. 5 is a block diagram of the channel switching apparatus.

An antenna 501 receives a radio signal. Reception electric field strength detecting means 502 detects a level of the received signal which the antenna 501 has received, and detects the total sum of the reception electric field strength of the desired wave and that of the interference wave. Signal processing means 503 is a circuit, which extracts only the desired wave signal from the received signal in which the interference wave is added to the desired wave received from the antenna 501 by use of an adaptive signal processing method.

A correlating device 504 calculates a correlation value between the desired wave extracted by the signal processing means 503 and the received signal. This calculation is performed to determine how many desired wave signals are included in the signal received by the antenna 501 since it is impossible to know the desired wave reception electric field strength from the extracted desired wave signal. The reception electric field strength of the received signal in which the desired wave and the interference wave are mixed is known. Therefore, correct desired wave reception electric field strength can be detected by computing the correlation value showing how many desired waves exist in the received signal.

A correcting circuit 505 is one that corrects the computed correlation value in accordance with the input signal level. The received signal received by the antenna 501 is amplified in accordance with the level, and controlled to be an input signal having a constant value before the signal processing is provided thereto. However, if the value deviates from the constant value, the correlation value is varied, depending on the large and small of the deviation. As a result, there occurs a case in which the correlation value is not correctly calculated. For this reason, the correcting means 505 detects the level of the received signal, and corrects the correlation value in accordance with the detection value so as to calculate the correct correlation value.

The following will specifically explain an operation of the correcting circuit 505 with reference to FIGS. 6 and 7. FIG. 6(a) shows an input signal, FIG. 6(b) shows a set value of the desired wave signal, and FIG. 6(c) shows the correlation value. FIG. 6 denotes a case in which the received desired wave is smaller than the set level, and FIG. 7 denotes a case in which the received desired wave is substantially the same as the set level. It is assumed that the exactly the same desired wave signal is included in the input signal in FIGS. 6 and 7.

If the correlation between the input signal (a) and the set level (b) is calculated in each of FIGS. 6 and 7, the calculated correlation value is varied, depending on the level of the input signal as shown in (c) of each of FIGS. 6 and 7. For this reason, the desired wave signal component in the correct input signal cannot be calculated. The correcting circuit 505 detects the shift between the input signal level (a) and the set level (b) so as to correct the correlation value calculated by the correlating device 504.

Next, a calculator 506 calculates the reception electric field strength signal of the desired wave from both the corrected correlation value and the electric field strength of the received signal input from the reception electric field strength detecting means 502. Moreover, a calculator 507 calculates the reception electric field strength signal of the interference wave from both calculated reception electric field strength of the desired wave and the electric field strength of the received signal input from the reception electric field strength detecting means 502.

According to the above-explained structure, the interference wave reception electric filed strength can be detected during communications. Then, the outputs of the calculators 506 and 507 are input to a comparator 508.

The comparator 508 calculates the ratio of the desired wave reception electric field strength to the interference wave reception electric field strength, and the D/U ratio. Then, a storing circuit 509 stores a fixed amount of the calculated D/U ratio. Predicting means 510 calculates, for example, an average value, a regression line, etc., from the past numerical group stored in the storing circuit 509. Whereby, a current D/U ratio having high reliability is calculated and a D/U ratio at several times ahead is predicted.

On the other hand, the output of the signal processing means 503 is demodulated by demodulating means 511 so as to be input to FER detecting means 512. The FER detecting means 512 calculates an error rate of the received signal so as to be output to a storing circuit 513. The storing circuit 513 stores a fixed amount of FER output from the FER detecting means. Predicting means 514 calculates, for example, a regression line, from the past numerical group stored in the storing circuit 513. Whereby, an FER at several times ahead is predicted.

The outputs of predicting means 510 and 514 are input to determining means 515. Then, the determining means 515 outputs the determination result to switching means 516. The switching means 516 notifies a control station of the switching of the communication channel by using a switching signal S.

Figures 8, 9:
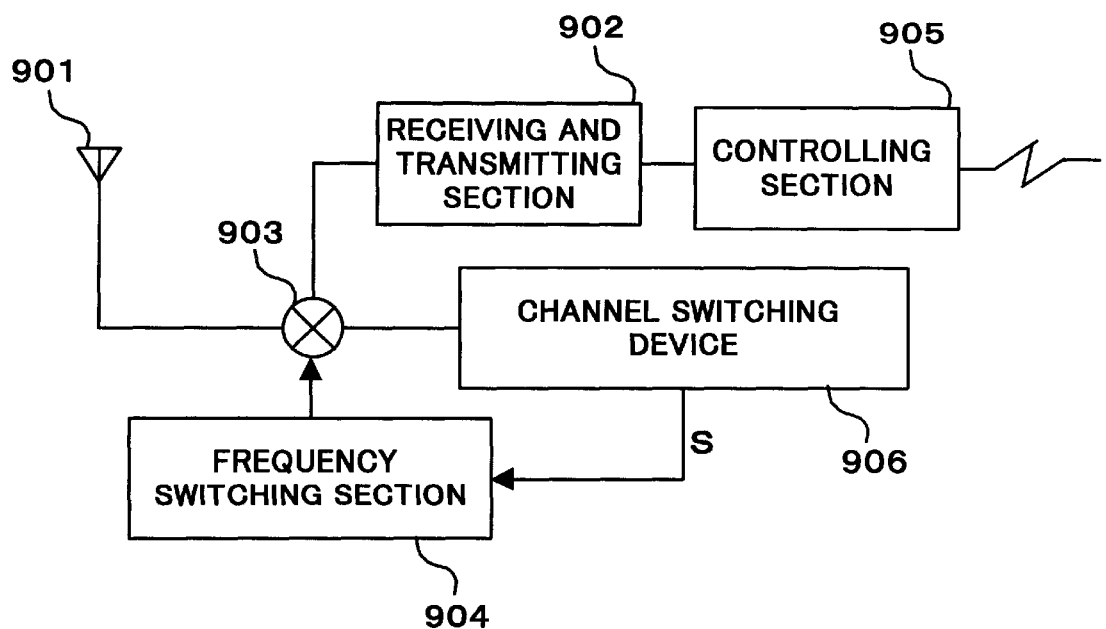
FIG. 8 is an explanatory view of determination conditions of the channel switching apparatus according to the second embodiment of the present invention.
FIG. 9 is a schematic block diagram of a base station apparatus using the channel switching apparatus according to the second embodiment of the present invention.

The predicting means 510, 514 and the determining means 515 maintain the channel currently in communications if it is predicted that FER is deteriorated, while the D/U ratio is improved, as shown in FIG. 8 in the future. Also, the predicting means 510, 514 and the determining means 515 maintain the channel currently in communications if it is predicted that FER is improved, while the D/U ratio is deteriorated, as shown in FIG. 8 in the future. In either case, a threshold value for switching the communication channel is set to a value around the limitation of the FER and D/U ratio. This reduces the opportunity for repeating the change of the communication channel, thereby making it possible to improve the effective use of the frequency.

Thus, the detection can be correctly performed at a certain time distance using the D/U ratio, which is instantaneously varied in accordance with a radio wave propagation environment. Also, the future communication state is predicted from the past numeral group of the D/U ratio or the FER at the several times ahead, thereby making it possible to adapt speedily for the change in the radio wave propagation environment and to maintain the stable high communication quality.

In other words, the channel is switched from the channel having the interference wave to the channel having no interference wave before the communication quality is deteriorated. As a result, a communicable distance and time between the base station and the mobile station increases, so that the channel capacity can be improved. More specifically, the change in the D/U ratio or the change in the FER are predicted by the predicting means. Then, if there is possibility that the communication quality of the current channel will be improved, depending on the future change, the use of the current channel is continued. Conversely, if there is no possibility that the communication quality of the current channel will be improved and it is determined that the communication quality is further deteriorated, the channel is quickly switched.

The channel switching apparatus explained in the first and second embodiment is used in the system in which the radio communication is performed such as a PHS system, mainly in the base station apparatus of the radio communication system. FIG. 9 is the block diagram showing the outline of the base station apparatus to which the channel switching apparatus of the present invention is applied. Transmitting data is generated by a receiving and transmitting section 902. Then, a mixer 903 multiplies transmitting data by a frequency input from a frequency switching section 904, and the resultant data is transmitted from an antenna 901. When the switching signal S is output from a channel switching device 906, the transmitting frequency is switched by the frequency switching section 904 so that the switching of the communication channel is performed.

Similarly, the channel switching apparatus of the present invention can be applied to the radio communication mobile station apparatus. If the mobile station apparatus predicts a reduction in the network quality of the communication channel in communications, the mobile station apparatus requires the switching of the communication network to the base station and the control station. Then, the mobile station apparatus switches the communication channel by an instruction from the base station apparatus.

Industrial Applicability

The channel switching apparatus of the present invention is used in the system in which the radio communication is performed such as a PHS system, mainly in the base station apparatus of the radio communication system. The channel switching apparatus of the present invention can be also applied to the radio communication mobile station apparatus. According to the present invention, the switching of the communication channel is performed, and the receiving state can be detected without interrupting communications so as to improve the communication quality.

What is claimed is:

1. A channel switching apparatus comprising:
  a desired wave reception electric field strength detecting section that detects a desired wave reception electric field strength of a mobile station;

an interference wave reception electric field strength detecting section that detects an interference wave reception electric field strength at a same frequency;

a comparing section that compares said an output of said detecting sections with each other;

a frame error rate detecting section that detects an error rate in a receiving signal; and a switching section that compares a comparison result of said comparing section with a detection result of said frame error rate detecting section and switches a communication channel based on said comparison result of said comparing section and said detection result of said frame error rate detecting section.

2. The channel switching apparatus according to claim 1, wherein said switching section comprises a second comparing section that compares said comparison result of said comparing section with said detection result of said frame error rate detecting section and a determining section that determines whether or not a channel is switched based on said comparison result of said comparing section so as to output an instruction for switching, and suitably switches said communication channel in accordance with said output of said determining section.

3. The channel switching apparatus according to claim 2, wherein said determining section comprises a storing section and said detection result of said frame error rate detecting section, and a predicting section that predicts a future network state from said stored comparison result and detection result.

4. The channel switching apparatus according to claim 3, wherein said desired wave reception electric field strength detecting section comprises a signal processing section that extracts only said desired wave from signals in which said interference wave is added to said desired wave received from an antenna, and a correlation value calculating section that calculates a correlation value between said desired wave signal output from said signal processing section and said signals in which said interference wave and said desired wave received via said antenna are added.

5. The channel switching apparatus according to claim 4, wherein said correlation value calculating section comprises a correcting section that determines a high and low states of said input signal so as to correct said calculated correlation value.

6. The channel switching apparatus according to claim 3, wherein said interference wave reception electric field strength detecting section comprises said desired wave reception electric field strength detecting section and a differentiating section that outputs a difference between said reception electric field strength of said signals, in which said interference wave and said desired wave received via said antenna are added, and said desired wave reception electric field strength detected by said desired wave reception electric field strength detecting section.

7. A base station apparatus comprising the channel switching apparatus of claim 3.

8. A mobile station apparatus comprising the channel switching apparatus of claim 3.

9. A radio communication system wherein the channel switching apparatus of claim 3 is provided in any one of a base station apparatus and a mobile station apparatus.

10. A channel switching method comprising:

detecting a desired wave reception electric field strength of a mobile station;

detecting an interference wave reception electric field strength at a same frequency;

comparing reception of these detected electric field strengths with each other;

detecting an error rate of a received signal;

comparing a comparison result of said reception electric field strengths with said detected error rate; and switching a communication channel based on a comparison result of said reception electric field strengths and said detected error rate.

11. The channel switching method according to claim 10, wherein only a desired wave is extracted from a signal in which an interference wave is added to said desired wave received signal from an antenna, and a correlation value between an extracted desired wave signal and said signal in which said interference wave is added to said desired wave received from said antenna is calculated, whereby a detection of said desired wave reception electric field strength is performed.

12. The channel switching method according to claim 10, said detection of said interference wave reception electric field strength is performed by obtaining a difference between said desired wave reception electric field strength of said mobile station and said interference wave reception electric field strength of said signals in which said interference wave and said desired wave received via said antenna are added.

13. The channel switching method according to claim 10, wherein a future network state is predicted from both said comparison result between the desired wave reception electric field strength and said interference wave reception electric field strength and said detection result of said error rate.

* * * * *